United States Patent [19]

Bösch et al.

[11] 3,735,174
[45] May 22, 1973

[54] ELECTRIC MOTOR WITH HOLLOW ROTOR AND METHOD OF FABRICATING THE HOLLOW ROTOR

[75] Inventors: Lothar Bösch, 755 Rastatt; Hans-Joachim Blocher, 7418 Metzingen, both of Germany

[73] Assignee: Gesellschoft Fur Kernforschung mbH, Metzingen, Germany

[22] Filed: Nov. 27, 1970

[21] Appl. No.: 93,374

[30] Foreign Application Priority Data

Nov. 26, 1969 Germany..................P 19 54 280.4

[52] U.S. Cl. ........................310/266, 310/54, 310/77
[51] Int. Cl. ..................................................H02k 1/22
[58] Field of Search ......................310/266, 77, 67, 310/44, 54, 61, 26, 49 R

[56] References Cited

UNITED STATES PATENTS

| | | | |
|---|---|---|---|
| 2,102,409 | 12/1937 | Faus | 310/26 UX |
| 3,418,505 | 12/1968 | Mihalko et al. | 310/266 |
| 3,479,539 | 11/1969 | Brion | 310/49 |
| 3,356,877 | 12/1967 | Burr | 310/266 |
| 3,312,846 | 4/1967 | Baudot | 310/266 |
| 2,944,169 | 7/1960 | Schmidt | 310/266 |
| 1,796,556 | 3/1931 | Boitel | 310/266 X |
| 768,982 | 8/1904 | Duncan | 310/266 UX |
| 3,329,846 | 7/1967 | Lawrenson | 310/266 |
| 2,987,637 | 6/1961 | Bertsche et al. | 310/266 X |
| 3,148,294 | 9/1964 | Jaeschke | 310/266 X |
| 2,677,256 | 5/1954 | Donandt | 310/77 X |
| 3,480,810 | 11/1969 | Potter | 310/61 X |
| 3,439,201 | 5/1969 | Levy et al. | 310/61 X |
| 2,694,781 | 11/1954 | Hinz | 310/77 |
| 2,727,163 | 12/1955 | Meyer | 310/77 |

*Primary Examiner*—J. D. Miller
*Assistant Examiner*—Mark O. Budd
*Attorney*—Spencer & Kaye

[57] ABSTRACT

An electric motor with a hollow rotor is described whose armature winding is arranged on an extremely thin-walled tubular winding support. The stationary ferromagnetic core of the hollow rotor and the likewise ferromagnetic core of the exciting winding are equipped with cooling channels through which, e.g., water is fed for removal of the heat produced by the electric current. The hollow rotor, which is arranged on the armature shaft so as to be displaceable by means of a sliding sleeve can be slowed down by means of an electromagnetic braking device in such a way that the forces generated by a spring and an electromagnet in the direction of the armature shaft are transferred to the hollow rotor by a disk attached to the sliding sleeve. The braking areas used are parts of the inside wall of the winding support which has a cylindrical or conical shape. Moreover, a method of fabricating a hollow rotor is described.

14 Claims, 4 Drawing Figures

Schnitt A-A

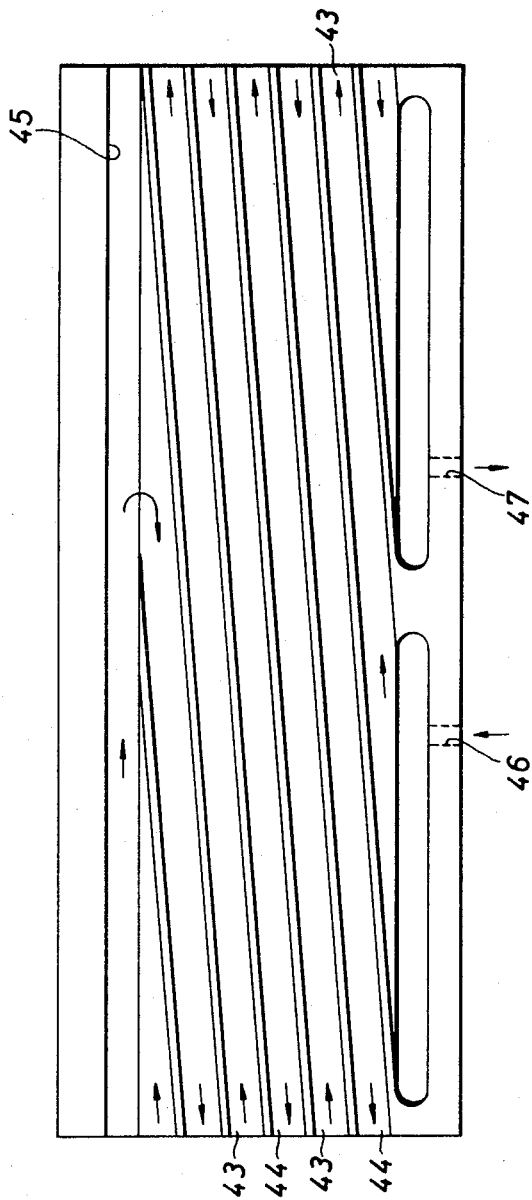

ELECTRIC MOTOR WITH HOLLOW ROTOR AND METHOD OF FABRICATING THE HOLLOW ROTOR

BACKGROUND OF THE INVENTION

The invention relates to a DC motor with hollow rotor for the generation of high nominal torques and high accelerations at low moment of gyration.

These motors are required especially for electrical drives with extremely fast startup and slowing down actions, e.g., as servo-motors in measurement and control systems where high efficiencies and minimum dimensions are needed and, at the same time, only a low moment of inertia is to be overcome in the case of a separate drive.

It is known (catalog "DC Mikromotoren" of Dr. Faulhaber company, Feinmechanische Werkstatten, 7036 Schonaich/Wurtt., Germany) that these requirements can be fulfilled by keeping the weight of the armature low through separating the armature winding from the ferromagnetic armature carrying the magnetic flux. In this type of ironless hollow rotor the winding is cast in a synthetic resin plastic or the like and connected with the armature shaft through a disk.

The fact that the winding treated with synthetic resin must itself be used to transmit the torque results in three specific disadvantages: The mechanical stability of the assembly is limited, and influences of temperature and mechanical oscillations may give rise to temporary or permanent deformations of the winding. This necessarily requires a wider air gap which, in turn, results in either more expense for excitation or a decrease of power. The temperature carrying capacity, which is limited for mechanical reasons, at the same time implies a limit to the current carrying capacity and, hence, to power.

The same disadvantages are inherent in the ironless hollow rotor of another well-known motor which is described in the Honeywell catalog "Servomotor HSM" dated Nov., 1968.

SUMMARY OF THE INVENTION

Hence, the invention is based on the problem of designing a motor with a hollow rotor whose winding does not have to directly transmit the torque to the armature shaft, in which deformations of the windings are impossible and which allows small effective air gaps.

In the invention, this problem is solved by an electric motor consisting of an armature winding support which is made of a material of low electric conductivity and high relative permeability and is frictionally connected with the armature shaft, armature winding and winding support together making up the main part of a hollow rotor and the winding support being designed as an extremely thin-walled tube.

The tubular winding carrier makes for high stability of shape of the hollow rotor which allows smaller air gaps to be achieved through maintaining closer tolerances in the fabricating process at less expenditure. In addition, the ratio between torque and magnetic flux will increase with decreasing size of the air gap.

To connect the winding support with the armature shaft, the winding support is designed as a flange on at least one side. If a rotor has a length — diameter ratio in excess of two to one, it is advisable to connect both sides of the rotor to the shaft.

If only one side of the winding support is connected to the shaft transmitting the torque, magnetic return will be made in a well-known way through a free standing hollow cylindrical armature core extending into the hollow rotor and made of a material of high relative permeability with low eddy current losses. In the case of smaller rotor diameters it may be useful to connect the winding support to the front side of a shaft butt and fill the bore of the hollow rotor with a stationary cylindrical or hollow cylindrical armature core for magnetic return.

The invention also serves purpose of attaining the maximum possible current carrying capacity of the armature winding and the exciting winding so that a predetermined motor power is achieved with a minimum of copper and, hence, low mass.

In the invention, this is achieved by an electric motor consisting of a hollow rotor with a tubular winding support frictionally connected with the armature schaft, a ferromagnetic armature core for magnetic return which at least partly fills the bore of the hollow rotor and is firmly attached to the motor casing, and of devices for removal of the heat produced by the electric current from at least one of the components adjacent to the exciting and armature windings, the armature core of the hollow rotor and the ferromagnetic core of the exciting winding (exciting core). These devices may consist, e.g., of cooling channels arranged in the armature core and the exciting core and through which water is ducted as the coolant.

In this case, it is advantageous to arrange bores on the periphery of the hollow cylindrical armature core extending in the direction of its longitudinal axis which are divided into two groups of channels on the front side which is connected with the bearing plate, by one channel for introducing a coolant and extending mainly on the level of the front face, and another channel situated on the same level for removing a coolant, which two groups of channels are interconnected within each group and connected with each other by a third channel on the other front side.

It may be advantageous for an exciting core with a cylindrical outside to have cooling channels arranged on its periphery in the way of a thread with at least two courses at a predetermined pitch in such a way that the coolant flows in through a first course and back in a second course. In this arrangement, the inlet for the coolant is connected to a first course of the cooling channels on a front side of the exciting core and the outlet of the coolant is connected to a second course on the same front side and both courses are connected with each other on the other front side so that the coolant can flow through the cooling channels from the inlet to the outlet.

Another purpose of the invention is the development of an electromagnetic braking device which can function without any increase in mass of the hollow rotor.

In the invention, this problem is solved by an electric motor consisting of a hollow rotor with a tubular winding support, a sleeve arranged on the armature shaft so as to be axially displaceable (sliding sleeve) to which the hollow rotor is firmly attached and an electromagnetic device for displacing the hollow rotor on the armature shaft from its first position (operating position) to another position (braking position) where, in the braking position, a surface of the winding support is contacted with part of the surface of the free standing armature core acting as a braking area.

In this design, the elctromagnetic device for displacing the hollow rotor consists essentially of a ferromagnetic disk which is so connected with the sliding sleeve that no torque is transmitted to the disk but that the sliding sleeve is axially displaceable on the armature shaft by means of at least one electromagnet acting upon the disk. In this case, at least one spring acts on the disk connected with the sliding sleeve and arrests the hollow rotor in one of the possible two positions, i.e., operating position and braking position, while the hollow rotor is moved into the other of the possible two positions by an electromagnet counteracting the spring force and kept there. During the braking action, part of the internal wall of the flange connecting the tubular winding support with the sliding sleeve is pressed against the front side of the stationary armature core.

In another modification of the electric motor the winding support and the stationary armature core are conical and at least part of the lateral conical area of the stationary armature core is used as the braking area.

In fabricating a winding support of an electric motor with a hollow rotor it is advisable to proceed in such a way that grooves corresponding to the arrangement of the windings are made in the outside of a tube and such an amount of material is machined off the inside of the tube that the arrangement of the windings still withstands the required mechanical stress. Attachment, resin casting and baking of the winding may be carried out either before or after machining of the inside of the tube.

For groove formation and for increasing the mechanical stability, mechanical webs are put on a thin-walled tube by one of the methods of hard surfacing, welding, soldering, metal bonding. In this process, the expense involved in finishing of the interior of the tube can be reduced considerably of eliminated entirely.

Especially with larger motors it may be advantageous to cast the winding support and use a casting material consisting of a mixture of metal particles and an electrically non-conductive binder. If the right type of metal particles are used, this material has a relatively high permeability and a practically infinitely high electrical resistivity. Similar advantages are offered by winding supports pressed out of metal powder and sintered afterwards. Of course, the winding supports can be made either with or without grooves.

BRIEF DESCRIPTION OF THE DRAWINGS

FIG. 4 is a development of the exciting core with cooling channels.

DESCRIPTION OF THE PREFERRED EMBODIMENTS

Figure 1:
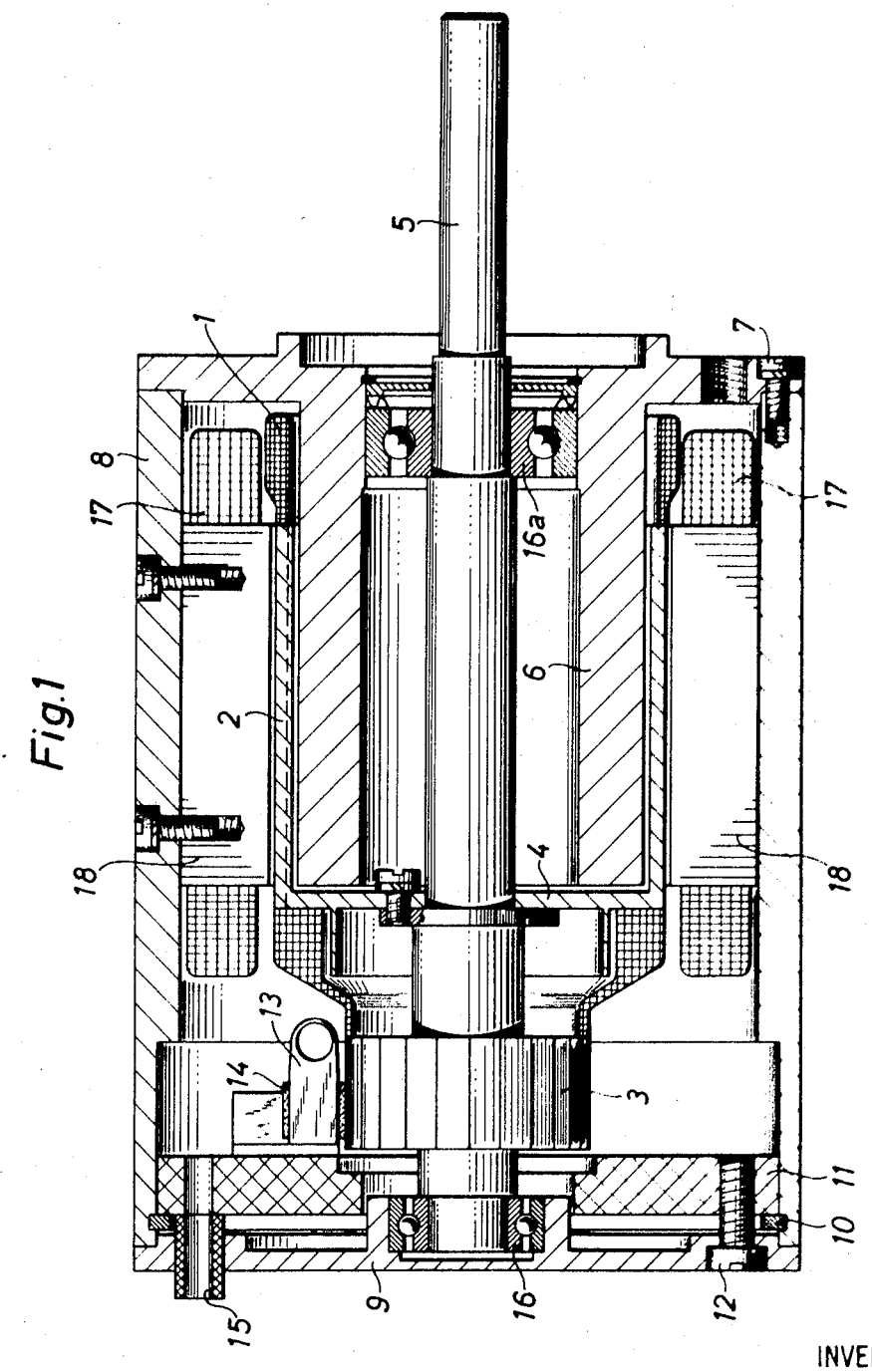
FIG. 1 is an axial section through a motor with a hollow rotor.

In FIG. 1, the armature winding 1 is inserted into grooves of a winding support 2 and firmly connected with it through casting with synthetic resin. On the side facing the collector 3, the winding support is designed as a flange 4 which connects it with the shaft 5. The bore of the winding support in partly filled by a hollow cylindrical stationary armature core 6 which is attached to the steel tube casing 8 by means of a screwed connection 7. On the collector side, the casing is closed by the bearing plate 9.

The bearing plate and the casing are indirectly connected with each other through a lock washer 10, a washer 11 made of insulating material, and screws 12. The washer 11 of insulating plastic material carries the holders 13 of the carbon brushes 14. Electric connections are carried through a bore 15. The bearing plate 9 and the armature core 6 carry ball bearings 16 and 16a to support the armature shaft 5. Field windings 17 with an iron core 18 are installed on the inside of the steel tube housing 8 for generation of the magnetic field.

Figure 2:
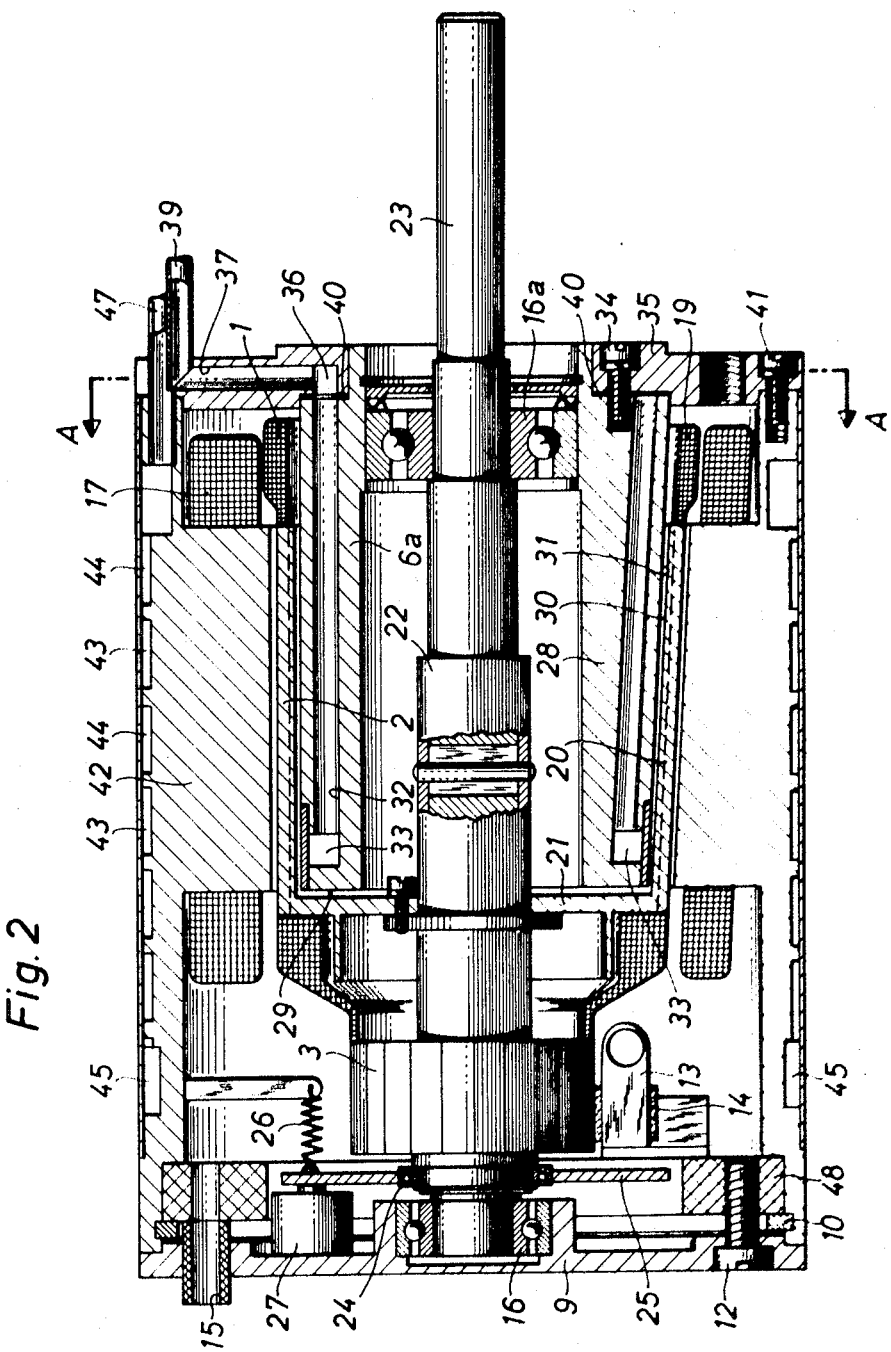
FIG. 2 is an axial section through a motor with a hollow rotor with a braking device and cooling channels.

FIG. 2 is an axial section through a motor with a hollow rotor, a braking device and cooling channels. The upper half of the diagram represents a cylindrical winding support, the lower half a conical winding support as one other possible type of winding support.

The cylindrical armature winding 1 is inserted into grooves of a cylindrical winding support 2 or a conical armature winding 19 into grooves of a conical winding support 20 and firmly connected with it through casting with plastic resin. The winding support, irrespective of its shape being cylindrical or conical, is designed as a flange 21 on its side facing the collector 3 and is connected with the sliding sleeve 22 through this flange. The sliding sleeve is equipped with guiding elements engaging into the corresponding guiding elements of the armature shaft 23 and allowing an axial displacement of the sleeve and, at the same time, a transmission of torque to be carried out. Also the collector 3 is firmly connected with the sliding sleeve 22. Moreover, the sliding sleeve carries a control disk 25 on the side facing away from the winding support through a ball bearing 24 which can be loaded axially, which control disk can be moved axially by a spring 26 in one direction and an electromagnet 27 in the other direction.

The bore of the cylindrical winding support 2 is filled with a hollow cylindrical stationary armature core 6a or, in the case of a conical winding support 20, with an essentially hollow cylindrical armature core 28 which, however, is conical on the outside, in such a way as to leave only a narrow air gap between the winding support and the armature core.

The spring 26 forces the winding support 2 against the frontside 29 of the armature core 6a (braking position ), the electromagnet 27 counteracts the spring and moves the hollow rotor into the operating position.

In a conical arrangement, the spring and the electromagnet act in the same way. However, in the braking position, the conical shell areas of the winding support 30 and of the armature core 31 are forced upon each other.

Of course, it is possible also to arrange the spring and the electromagnet in such a way that the braking position is attained through excitation of the electromagnet. Another possibility is the distribution of several springs and several electromagnets on the circumference of the control disk.

Figure 3:
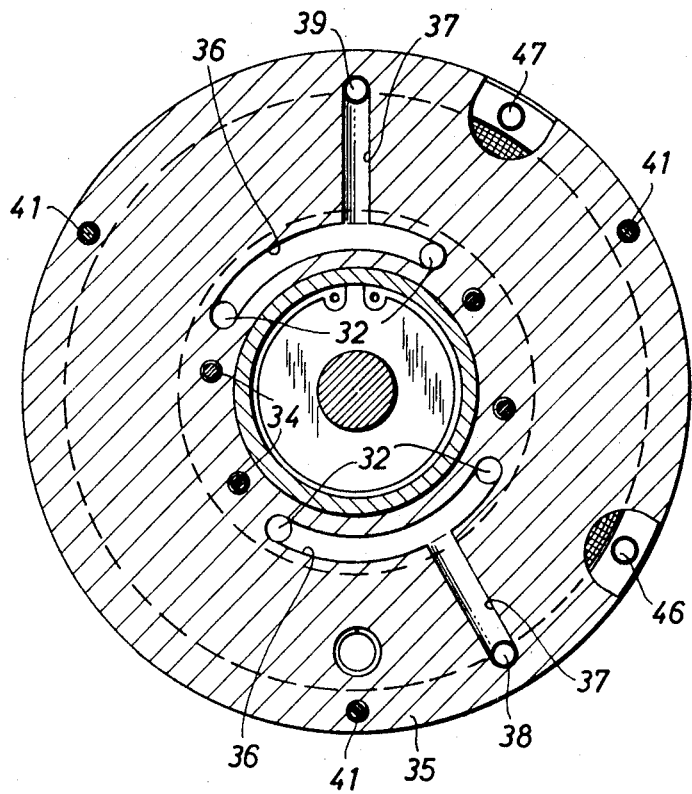
FIG. 3 is a section AA with cooling channels.

As can be seen also from the radial section AA in FIG. 3, four axial bores 32 are made in the armature core 6a and 28, respectively, as close as possible to the shell surface facing the winding support which bores are connected with each other on the front side facing the collector 3 by means of a radial annular channel 33.

A disk 35 is attached to the other front side of the armature core by a screwed connection 34. Two channels 36 are machined into the surface of that disk facing the armature core which connect two each of the bores 32 with each other. Moreover, two radial bores 37 are made in the disk 35 each of which ends in one each of the channels 36 and to which the coolant inlet line 38 and the coolant outlet line 39, respectively, are connected. A flat seal 40 is installed between the armature core and the disk 35 for watertight connection of the cooling channels.

The disk 35 also connects the armature core with the exciting core 42 by means of a screwed connection 41 which exciting core accomodates the exciting winding 17 and, at the same time, constitutes the motor casing.

Cooling channels 43, 44 of rectangular cross section are arranged on the periphery of the exciting core and surround the core like a douple thread. As is evident from FIG. 4, the coolant flows in a clockwise direction in channel 43 and in a counter-clockwise direction in channel 44. Channels 43 and 44 are connected with each other by channel 45 on the collector side in such a way that the cooling water flows through an inlet channel 46 into channel 43, from here on into the connecting channel 45 and via channel 44 into the outlet channel 47.

On the collector side, the motor is closed with the bearing plate 9. The bearing plate and the exciting core 42 serving as a casing are connected with each other indirectly through a lock washer 10, a washer 48 of insulating material, a screw 12. The washer 48 carries the holders 13 of the carbon brushes 14. Electric connections are led through a bore 15. The bearing plate 9 and the armature core 6a and 28, respectively, are equipped with ball bearings 16 and 16a to support the armature shaft 23.

The advantages arising from the invention lie especially in the fact that the use of a winding support of higher stability permits higher torques to be transmitted from the winding to the armature shaft. At the same time, the winding support improves the stability of shape of the winding. This higher stability of shape allows a reduction of the air gap to be made whose effective value is further reduced through the use of a winding support made of a ferromagnetic material. This results in a major reduction of the exciting losses and, hence, a higher useful flux and higher torque at the same amount of excitation.

Moreover, the winding support according to the invention permits higher operating temperatures and thus a better ultilization at the same component size. The resistance to gamma radiation is also increased considerably with metallic winding supports, because the mechanical stability is no longer dependent on a hardly radiation resistant plastic material.

Moreover, quietness of operation is greatly enhanced which is important especially at low speeds in many areas of application.

Another advantage of the invention is the fact that the winding support, because of its stability, can be used to generate brake torque and the braking devices are able to act direct upon the winding support. The heat this generates is removed via the metallic winding support. This eliminates the need for special brake disks to be attached to the armature shaft, which would increase the moment of inertia.

The provision of cooling channels in the ferromagnetic core of the exciting winding and in the armature core adjacent to the armature winding also permits a much better ultilization of the windings which, under otherwise unchanged conditions, allows a tenfold increase in motor power. Moreover, the increase in current carrying capacity leads to a further reduction of mass and thus of the moment of gyration of the rotor.

We claim:

1. An electric motor of the double air gap type for producing high rated torques and high accelerations with low inertial moment comprising a stationary armature core; a stationary exciting core; an excitation winding associated with said exciting core; an armature shaft; a displacement sleeve on said armature shaft, said displacement sleeve being displaceable with respect to said armature shaft in an axial direction; a thin walled winding carrier having a frontal face in the form of a flange connected to said displacement sleeve; an armature winding positioned on said winding carrier; an axially loadable bearing means; a non-rotatable control disk connected to said displacement sleeve via said bearing means for transferring axial movements of said control disk to said displacement sleeve; and non-rotatable means separate and distinct from the excitation winding and the armature winding for axially moving said disk from a first position in which it positions said winding carrier in its operating position to a second position in which it positions said winding carrier in a braking position in which at least a portion of said winding carrier contacts said armature core.

2. An electric motor as defined in claim 1, wherein said winding carrier is constructed from a material having a relative magnetic permeability $\mu$ substantially greater than 1 and a low electric conductivity and eddy current loss.

3. An electric motor as defined in claim 2 wherein the material of the winding carrier comprises sintered metal particles.

4. An electric motor as defined in claim 2 wherein the material of the carrier is a mixture of metal particles and an electrically non-conductive binder.

5. An electric motor as defined in claim 1 further comprising cooling fluid channels within said exciting core and within said armature core for removing heat produced by said exciting winding and said armature winding while maintaining the air gaps of the motor free of cooling fluid.

6. An electric motor as defined in claim 1, further including a motor housing and wherein said means for axially moving said disk comprises at least one electromagnet fastened to said motor housing and at least one spring coupled between said motor housing and said control disk.

7. An electric motor as defined in claim 6, wherein said at least one electromagnet in its energized state positions said control disk in the first position and said at least one spring urges said control disk toward the second position in which it positions said winding carrier in the braking position.

8. An electric motor as defined in claim 6, wherein said at least one spring urges said control disk toward the first position and said at least one electromagnet in its energized state positions said control disk in the second position in which it positions said winding carrier in the braking position.

9. An electric motor as defined in claim 1, wherein said stationary armature core includes a free frontal face developed as a braking surface and said flange of said winding carrier contacts said free frontal face in the braking position.

10. An electric motor as defined in claim 6, wherein said stationary armature core includes a free frontal face developed as a braking surface and said flange of said winding carrier contacts said free frontal face in the braking position.

11. An electric motor as defined in claim 7, wherein said stationary armature core includes a free frontal face developed as a braking surface and said flange of said winding carrier contacts said free frontal face in the braking position.

12. An electric motor as defined in claim 1, wherein said winding carrier and said stationary armature core are conical, at least a portion of the lateral surface of said armature core contacting said winding carrier during braking.

13. An electric motor as defined in claim 1, further comprising a motor housing including bearing supporting means, wherein said stationary armature core is in the form of a hollow cylinder with a frontal face and having cooling channels disposed in the vicinity of its periphery in the direction of its longitudinal axis, said cooling channels being connected together by an annular channel in the vicinity of said frontal face; and further comprising two arcuate cooling channels in the form of portions of a circular arc in said bearing supporting means into which said cooling channels in said armature core open thereby combining them into two groups, and two radial channels in said bearing supporting means which open into said arcuate cooling channels for feeding in and removing the coolant.

14. An electric motor as defined in claim 1 wherein said exciting core is a cylindrical exciting core with two frontal faces and having cooling channels disposed at its periphery in the form of a double thread defining a first passage and a second passage; and further comprising an intake line for coolant connected to said first passage at one of said frontal faces, a discharge line for coolant connected to said second passage at said one frontal face, and an annular channel at the other frontal face of said exciting core for connecting said cooling channels.

* * * * *